June 14, 1960     C. A. SHOEMAKER     2,940,174
APPARATUS FOR ADJUSTING VEHICLE HEADLAMPS
Filed July 19, 1956     4 Sheets-Sheet 4
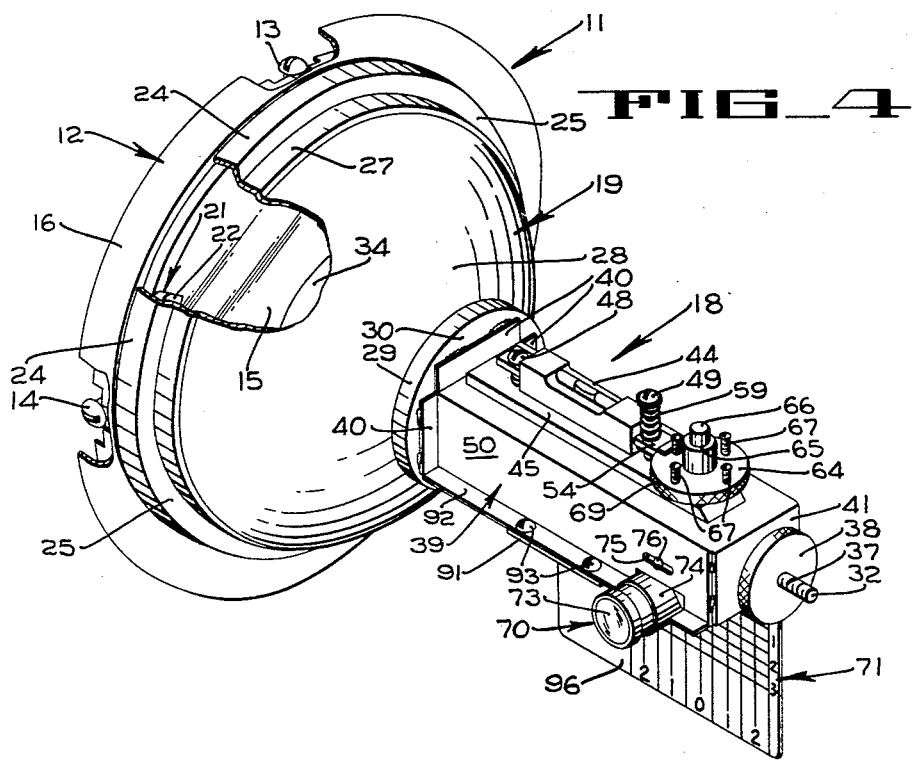
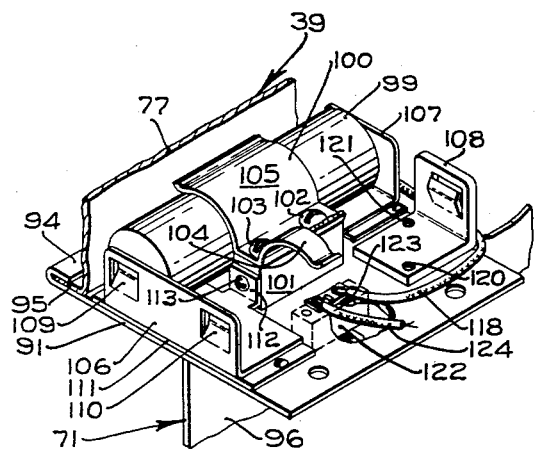
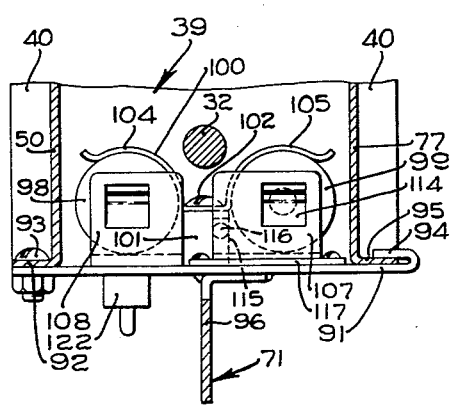
INVENTOR
CLYDE A. SHOEMAKER
BY Hans G. Hoffmeister
ATTORNEY 2,940,174
Patented June 14, 1960

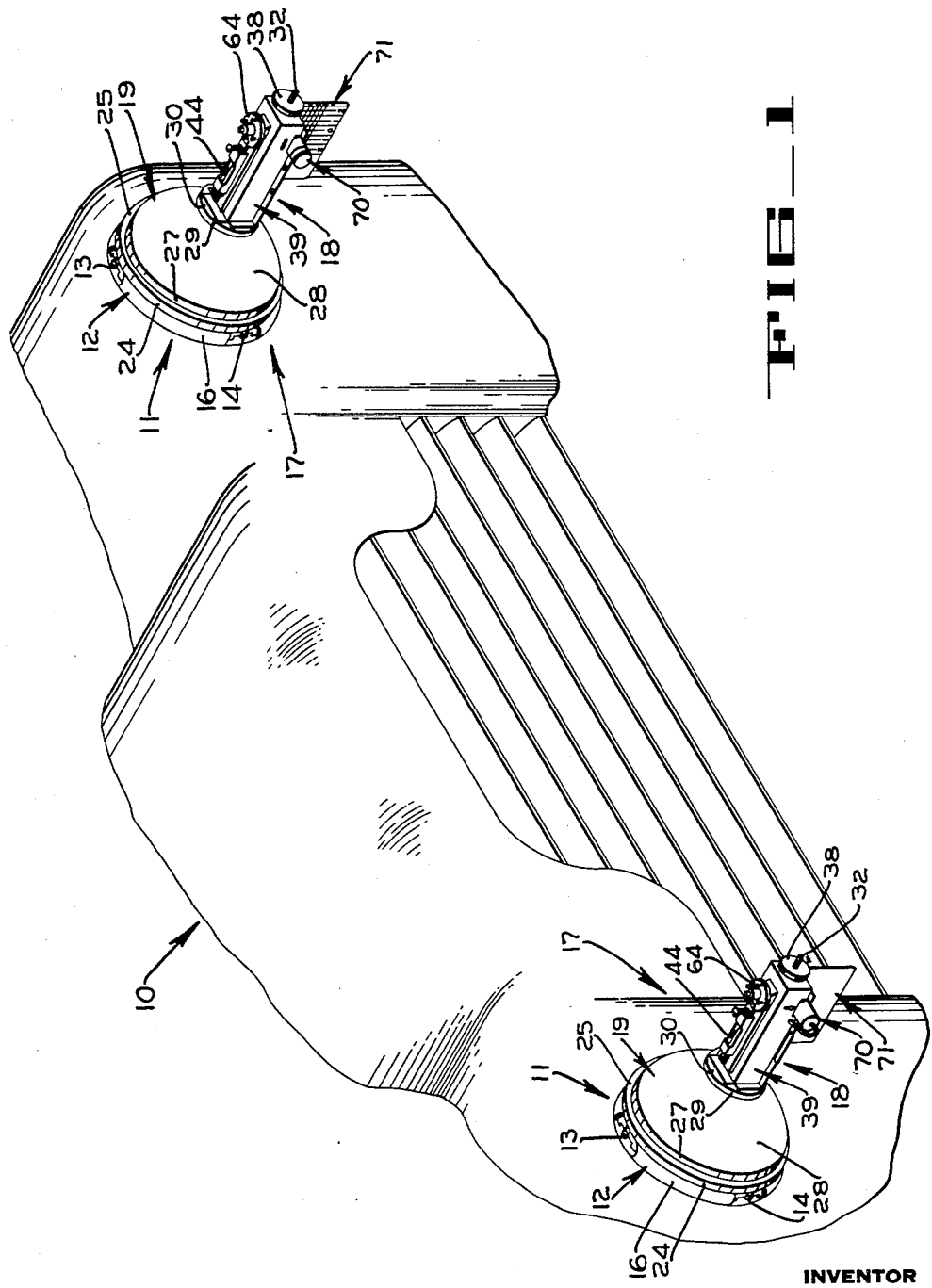

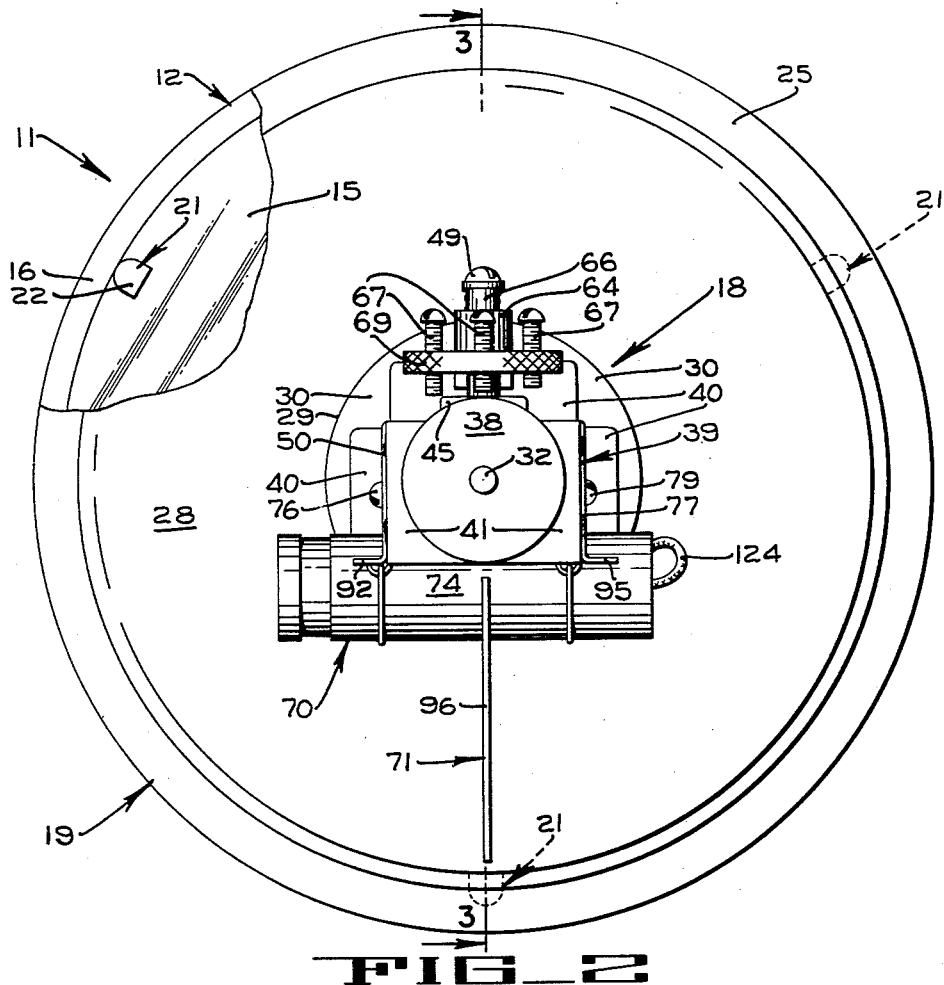
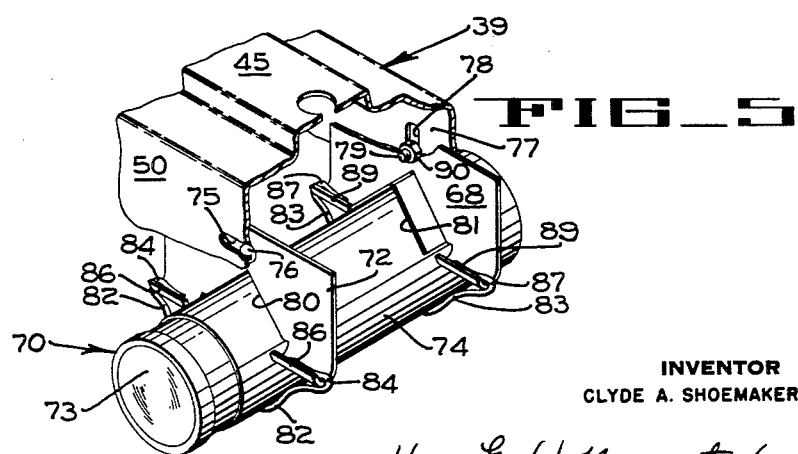

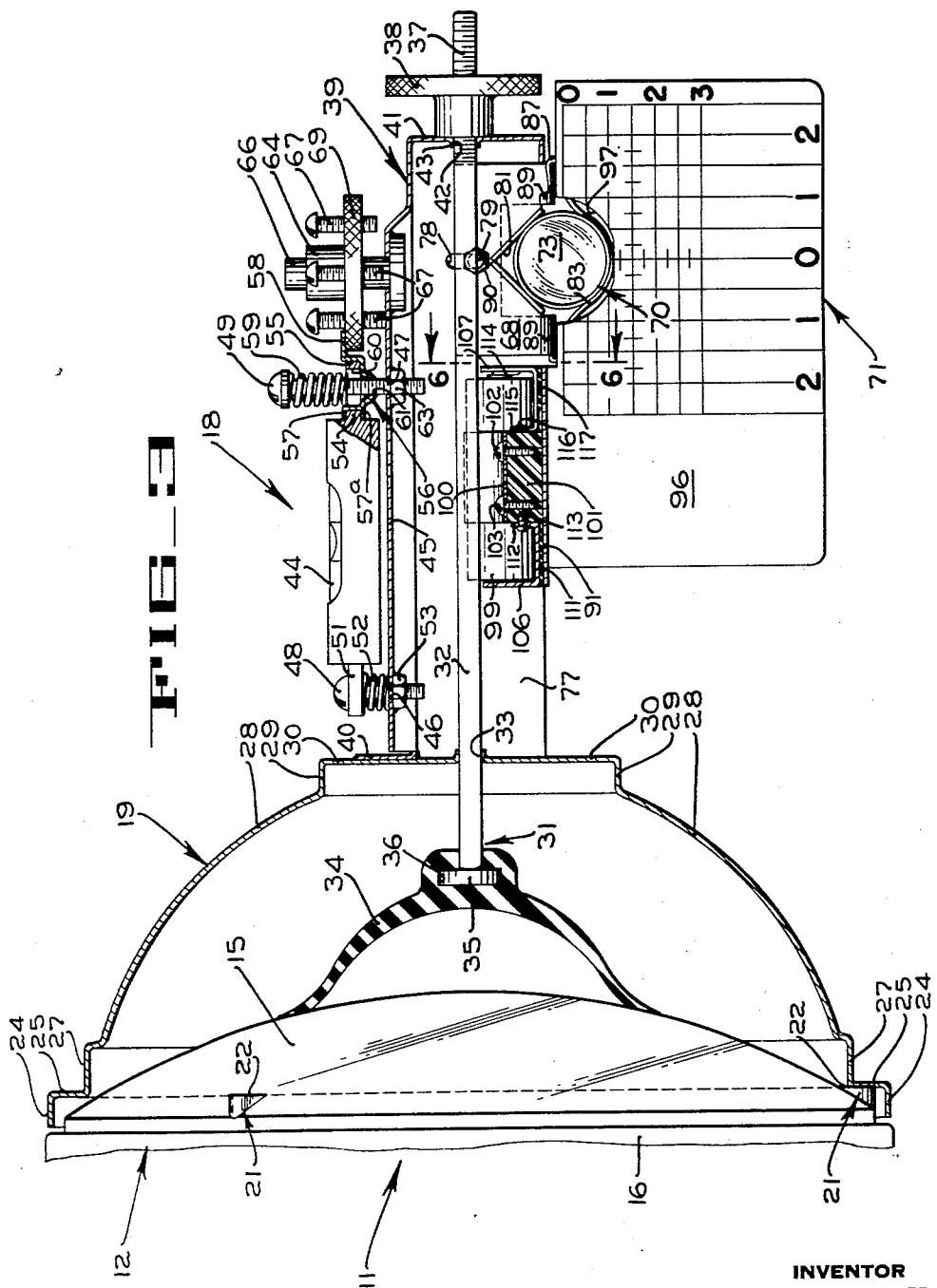

2,940,174

APPARATUS FOR ADJUSTING VEHICLE HEADLAMPS

Clyde A. Shoemaker, Pewamo, Mich., assignor to Food Machinery and Chemical Corporation, San Jose, Calif., a corporation of Delaware Filed July 19, 1956, Ser. No. 598,864

15 Claims. (Cl. 33—180)

The present invention appertains to an apparatus for use in adjusting vehicle headlamps, and more particularly relates to an improved device adapted for use in adjusting headlamps having bosses formed on the lens thereof.

An object of the present invention is to provide a headlamp adjusting apparatus, which is adjustable with facility and ease of operation.

Another object of the present invention is to provide a headlamp adjusting apparatus adaptable for use with headlamps having lens bosses thereon.

Another object of the present invention is to provide a headlamp adjusting apparatus having improved mountings for a light beam projector and target.

Another object of the present invention is to provide a headlamp adjusting apparatus having an improved adjustable mounting for a gravity responsive leveling device.

Other objects and advantages of the present invention will become apparent from the following description and drawings, in which:

Fig. 1 is a fragmentary perspective of headlamp adjusting apparatus embodying the invention and illustrated mounted upon headlamps of a vehicle.

Fig. 2 is an enlarged front elevation of the headlamp adjusting apparatus, partially broken away to illustrate the lens boss.

Fig. 3 is a section of the headlamp adjusting apparatus taken substantially along line 3—3 of Fig. 2 with parts shown in elevation.

Fig. 4 is an enlarged perspective, having a part broken away, of the headlamp adjusting apparatus mounted on a headlamp.

Fig. 5 is an enlarged fragmentary perspective of the mounting arrangement for a light beam projector.

Fig. 6 is a section taken substantially along line 6—6 of Fig. 3, illustrating the mounting of the batteries for the light beam projector.

Fig. 7 is an enlarged fragmentary perspective illustrating the mounting of the batteries for the light beam projector.

In Fig. 1, a vehicle 10 is illustrated having a pair of headlamps 11. Each headlamp includes a housing 12 universally mounted on the vehicle 10 in a conventional manner. In order to provide vertical and horizontal adjustment for the housing 12, vertical adjusting screw 13 and horizontal adjusting screw 14, respectively, are provided. The vertical and horizontal adjustments are conventional and well known. The headlamp 11 comprises a sealed beam unit having a lens 15 suitably mounted in the housing 12 by a conventional retaining ring 16. The sealed beam unit moves as a unit with the housing 12 in response to the universal movement and adjustment of the housing 12.

A headlamp adjusting apparatus 17 (Figs. 3 and 4) includes a pair of headlamp aiming devices 18 adapted to be temporarily mounted on the headlamps 11, respectively. For mounting the aiming device 18 to the headlamp 11, each aiming device 18 comprises a rigid, symmetrical, bowl-shaped member 19. The rigid member 19 has an annular flange 24, which encompasses three glass bosses or aiming pads 21 of the lens 15, and a radial flange 25, which abuts against and is seated upon front surfaces 22 of the lens bosses 21. Each lens boss 21, which is molded on the lens 15, has substantially a right triangular cross-sectional area and includes the front surface 22. During the manufacture of the lens 15, each front surface is accurately disposed with respect to the central axis of the lens 15 so that a plane through the front surfaces 22 of the three lens bosses 21 is normal to the longitudinal axis through the headlamp 11. Thus the radial flange 25 is normal to the longitudinal axis of the rigid member 19 and, when seated on the lens bosses 21, is normal to the central axis of the lens 15. Accordingly, the longitudinal axis of the rigid member 19, when the radial flange 25 abuts against the front surfaces 22 in even contact, is parallel to the longitudinal axis of the headlamp 11 and preferably is aligned therewith.

The rigid member 19 includes a ring section 27 which contributes to the rigidity thereof, and an arcuate section 28, which has configuration similar to a portion of a paraboloid. Integrally formed with the arcuate section 28 of the rigid member 19 is an annular flange 29. The flange 29 has a flat end portion 30, which is parallel with the radial flange 25. Therefore, the flat end portion 30 is normal to the longitudinal axis through the rigid member 19, as well as to the longitudinal axis through the headlamp 11.

Referring to Fig. 3, in order to anchor the aiming device 18 to the headlamp 11, a clamping arrangement 31 is provided. The clamping arrangement 31 comprises an elongated rod 32, which is received by a suitable centrally disposed aperture 33 of the flat portion 30 to provide accurate alignment for the rod 32. The rod 32 at one end is attached to a vacuum cup 34 which is formed of rubber-like material and is adapted to adhere by vacuum to the outer surface of the lens 15. At the vacuum cup end, the rod 32 is provided with an annular projection 35 which is seated in a recess 36 of the cup 34, thereby providing an anchor for the aiming device 18 through the vacuum cup 34. The other end of rod 32 is provided with a threaded portion 37, which is received in threaded engagement by a suitable clamping nut 38.

Referring to Figs. 2, 3 and 4, a housing 39 is provided having at one end thereof outwardly extending flaps 40, which are welded in flush engagement with the flat end portion 30 for securing the housing 39 to the rigid support member 19. The housing 39 encompasses the rod 32 and has at the other end thereof a downwardly extending flap 41, in which a suitable centrally disposed aperture 42 receives the other end of rod 32. The flap 41 has an annular flange 43 encompassing the aperture 42 to centrally position the rod 32 within the housing 39. Accordingly, after the vacuum cup 34 is engaged with the outer surface of the lens 15, the clamp nut 38 is rotated in threaded engagement with the rod 32 and engages the flap 41 to exert a pressure thereagainst. The pressure is transferred through the housing 39 to the flaps 40. Since the flaps 40 are in contact with the flat end portion 30, the pressure so transmitted causes the radial flange 25 to be urged in full and even contact with the lens bosses 21. As a result thereof, the radial flange 25 is retained parallel with the plane of the front surfaces 22 of the lens bosses 21 and normal to the center line or longitudinal axis of the housing 39.

For positioning each headlamp 11 so that the headlamp 11 has a predetermined vertical inclination to give the desired projection to the headlamp beam, a gravity-responsive leveling device, such as a spirit level 44, is provided. In order to mount the spirit level 44 to the aiming device 18, the housing 39 is provided with a raised section or rib 45. The raised rib 45, which is parallel with the longitudinal axis of the housing 39, has two apertures 46 and 47 (Fig. 3) therein to receive a pair of spirit level mounting screws 48 and 49. The spirit level 44 is spaced a suitable distance above the raised rib 45 to be adaptable for angular displacement.

To pivotally support the spirit level 44 at one end thereof, the mounting screw 48 is suitably received by an aperture (not shown) in a mounting bracket 51, which is integrally formed with the spirit level 44. A tension spring 52 is disposed around the screw 48 between the mounting bracket 51 and the raised rib 45 of the support member 39. After the screw 48 is inserted into the aperture 46 of the raised rib 45, it is retained in adjusted position by a threaded nut 53, which is welded to the rib 45. At the other end of the spirit level 44 is an integrally formed mounting bracket 54 which is seated in a recess 55 of a support plate 56 and has a slot 60 through which the screw 49 projects. The support plate 56 is split at one end and is provided with an upturned retaining lip portion 57, which embraces the upper surface of the bracket 54 and an arm 57a which engages the lower surface to maintain an engaging contact with the bracket at the free end thereof. At the other end of the support plate 56 is provided a flange 58, which extends laterally from the mounting bracket 54. A compression spring 59 is positioned between the head of the screw 49 and the mounting bracket 54. The screw 49 is received by the slot 60 of the mounting bracket 54, aperture 61 of the support plate 56 and the aperture 47 of the raised rib 45, and is retained in adjusted position by a threaded nut 63, which is welded to the rib 45.

In adjusting a headlamp, the level is first set at a predetermined inclination relative to the rib 45, which is parallel to the longitudinal axis of the headlamp. Then, when the headlamp is adjusted by screw 13 to bring the spirit level to a centered position, the axis of the headlamp will have a predetermined angle relative to the horizontal. In order to preset the spirit level 44 to a predetermined inclination, an indexing wheel 64 is provided. The wheel 64 includes a suitable bore 65 (Fig. 4) for receiving a vertical guide post 66 in sliding engagement. The post 66 is secured to the raised rib 45 by suitable means, such as welding.

For setting the wheel 64 to various predetermined heights, thus enabling the spirit level 44 to be adjusted to various degrees of angularity from horizontal, a plurality of stop members, such as screws 67, are received in threaded engagement by suitable apertures in the wheel 64. Each stop screw 67 is positioned at different predetermined heights above the raised rib 45. Therefore, the lower extremities of the stop screws 67 are arranged for various heights above the rib 45. The stop screws 67 are disposed at 90° intervals around the indexing wheel so that only one screw is in contact with the raised rib 45 at a given setting. Accordingly, when a desired vertical inclination for the level 44 is determined, the wheel 64 is rotated so that the designated screw 67 is positioned adjacent to the mounting screw 49 and the wheel 64 is then depressed until such designated screw engages the raised rib 45. The remaining screws are automatically positioned so as to be removed from the contact surface of the raised rib 45.

The wheel 64 is provided with an outer peripheral edge 69, which forms a seat for the flanges 58 of the supporting plate 56. Since the flange 58 of the support plate 56 rides along the upper surface of the peripheral edge 69 and is spring urged by the spring 59, the raising or lowering of the wheel 64 raises or lowers the supporting plate 56 thereby adjustably positioning the level 44. In so doing, the spirit level 44 is positioned for a predetermined vertical inclination. Thus, in adjusting each headlamp 11, individually, the vertical adjusting screw 13 associated therewith may be turned until the associated headlamp housing 12 assumes a position in which the spirit level 44 is horizontal. This assures proper vertical adjustment for the headlamp 11.

In adjusting vehicle headlamps, it is also desirable to make a horizontal adjustment so that the parallel light beams are projected parallel with the straight ahead travel of the vehicle or at a predetermined angle inwardly from the straight ahead travel of the vehicle. For positioning the headlamps 11 so that the headlamps 11 have a straight ahead beam or a predetermined horizontal angular displacement from the straight ahead travel of the vehicle, each aiming device 18 is provided with a light beam projector 70 (Fig. 1) and a target 71.

Referring to Figs. 2, 3 and 5, each light beam projector 70 comprises a conventional lens 73, suitable for adjustable focusing, and a casing 74. The casing 74 is a cylindrical metallic tubing and includes a suitable light emitter, condenser lens system and object slide, not shown.

For adjustably mounting the light beam projector 70 to the housing 39 of the aiming device 18, a horizontally adjustable mounting plate 72 (Fig. 5) and a vertically adjustable mounting plate 68 are provided. The mounting plate 72 is carried for horizontal adjustment on a wall 50 of the housing 39. The wall 50 has a suitable horizontally disposed slot 75, which receives a bolt 76 carried by the mounting plate 72. A suitable nut, not shown, in threaded engagement with the bolt 76, retains the mounting plate 72 in an adjusted position. Accordingly, the mounting plate 72 is horizontally positioned for slidable engagement with the inner surface of the housing wall 50 and is horizontally adjustable by variably positioning the bolt 76 in the slot 75. The mounting plate 68 is carried for vertical adjustment by a depending wall 77 of the housing 39. The depending wall 77 has a suitable vertically disposed slot 78, which receives a bolt 79 carried by the mounting plate 68. A suitable nut 90 in threaded engagement with the bolt 79 retains the mounting plate 68 in an adjusted position. Accordingly, the mounting plate 68 is positioned for slidable engagement with the inner surface of the depending wall 77 and is vertically adjustable by variably positioning the bolt 79 in the slot 78. The mounting plates 72 and 68 have vertically disposed substantially triangular shaped cutaway sections 80 and 81, respectively, suitable for receiving the horizontally disposed light beam projector 70, which extends laterally from the housing 39 and under normal circumstances perpendicular to the center line or horizontal axis of the housing 39. The cutaway sections 80 and 81 are 90 degree notches disposed with their flat sides at 45 degrees to the base of the respective mounting plates 72 and 68 and with the point of intersection of the sides on the vertical center line thereof.

In order to removably attach the light beam projector 70 from the mounting plates 72 and 68, spring wire retaining clips 82 and 83 are provided. The wire clip 82 is provided with hook end sections 84 which removably attach to an upturned lip 86 of the mounting plate 72, and extends below the light beam projector 70 for supporting the forward end thereof. The wire clip 83 is provided with hook end portions 87, which removably attach to an upturned lip 89 of the mounting bracket 68, and extends below the light beam projector 70 for supporting the rearward end thereof.

In establishing horizontal adjustment so that the parallel light beams of the headlamps 11 are projected in a straight ahead direction of travel with respect to the movement of the vehicle or a predetermined angle from the straight ahead direction of travel, the light beam emitted by the projector 70 is cast upon the target 71 mounted on the opposite aiming device 18. Referring to Fig. 3, the target 71 comprises a base member 91 secured at one end to a flange 92 (Fig. 6) of the wall 50 by a suitable means, such as screws 93. The other end thereof is provided with a hook portion 94, which engages a flange 95 of the wall 77. Secured to the base portion 91 is a downwardly extending plate 96 having indicia thereon suitable for headlamp adjustment so as to constitute a chart. The depending plate 96 is centrally disposed in a vertical plane coincident with the horizontal axis of the housing 39 and normal to the base member 91. A semi-circular section 97 (Fig. 3) is cut out of the depending plate 96 to suitably receive the substantially horizontally disposed light beam projector 70. It is to be noted that the plate 96 is normal to a horizontal plane taken on the optical center of the projector 70.

Thus, in adjusting each headlamp 11 individually, the associated horizontal adjusting screw 14 may be turned until the associated headlamp housing 12 assumes a position in which the beam of light cast by the projector 70 hits the designated area of the oppositely positioned target 71. This assures that the position of the headlamp 11 is properly adjusted.

Referring to Figs. 3, 6 and 7, a suitable source of energy, such as batteries 98 and 99, is provided for energizing the light emitter, not shown, in the light beam projector 70. The batteries 98 and 99 are carried by the base member 91 of the target 71. For maintaining the batteries 98 and 99 in a fixed position, a battery clip 100 (Fig. 6) is provided. The battery clip 100 is centrally disposed between the lateral ends of the supporting member 39 and is mounted on the base member 91 by an insulated post 101. Suitable mounting screws 102 and 103 are received by the battery clip 100 and the insulated post 101. The battery clip 100 has contour conforming end sections 104 and 105, which engage the batteries 98 and 99, respectively, to retain the same in a fixed position.

For establishing electrical connections from the batteries 98 and 99 to the light beam projector 70, contact plates 106, 107 and 108 (Figs. 6 and 7) are provided. Since the batteries 98 and 99 are connected in series, contact plate 106 is provided with two contacts 109 and 110. Contact 109 engages the negative end of battery 99, while contact 110 engages the positive terminal of battery 98. Hence, contact plate 106 establishes an electrical connection between the negative end of battery 99 and the positive terminal of battery 98. Contact plate 106 is insulated from the base plate 91 by suitable insulation, such as insulation strip 111, which is carried by the base plate 91. For mounting the contact plate 106, an angle extension 112 is provided, which is secured to the insulated post 101 by a screw 113.

Contact plate 107 is provided with a contact 114, which engages the positive terminal of battery 99. For mounting contact plate 107, an angle extension 115 (Fig. 6) is provided, which is similar to angle extension 112 of plate 106, and is secured to the insulated post 101 by a screw 116. Contact plate 107 is insulated from the base plate 91 by a suitable insulation, such as insulation strip 117. Connected to the contact plate 107 is a cable 118 (Fig. 7), which extends to the one side of a conventional toggle switch 122. The toggle switch 122 is suitably mounted on the base plate 91 and is received by an aperture 123 in the base plate 91. The other end of the toggle switch 122 is connected by a suitable cable 124 to the light emitter, not shown, in the light beam projector 70. Thus an electrical connection is established from the positive terminal of the battery 99 to the light emitter of the projector 70 through the toggle switch 122.

Contact plate 108 is mounted directly to the base plate 91 by suitable means such as screws 120 and 121. Therefore, a ground connection is established from the negative end of battery 98 to the base plate 91 through the contact plate 108. The light emitter, not shown, of the projector 70 is provided with an internal ground connection in a conventional manner through the metallic casing 74. The metallic casing 74 is in electrical contact with the base plate 91 through the housing 39 and the brackets 68 and 72. Thus, a complete ground connection is provided to the contact plate 108. Accordingly, when the toggle switch 122 is closed, the light emitter of the projector 70 is energized by the batteries 98 and 99 over a path including: contact plate 107, cable 118, toggle switch 122, cable 124 and contact plate 108.

In the operation of the headlamp adjusting apparatus 17, a headllamp aiming device 18 is mounted on each of the headlamps 11 with the lens 73 of the light beam projectors 70 facing inward toward the center line of the vehicle 10. The rigid support member 19 of each aiming device 18 is positioned so that the radial flange 25 thereof is seated on the lens bosses 21 and the vacuum cup 34 contacts the lens 15. The member 19 is rotated so that the spirit level 44 is up and the projector 70 is substantially horizontal. For anchoring each aiming device 18, the vacuum cup 34 is pressed against the lens 15 and the clamp nut 38 is tightened to exert a pressure against the lens bosses 21. Thereupon, the adjusting wheel 64 is set for desired vertical deflection. Vertical adjusting screws 13 are then individually manipulated until both spirit levels 44 are centered to complete the vertical adjustment. Following this operation, the switch 122 on the left hand aiming device 18 is closed to complete an electrical circuit for the emission of a beam of light from the left hand projector 70. The location of the beam of light is noted on the right hand target 71. Horizontal adjusting screw 14 on the left hand housing 12 is adjusted until the beam of light is projected on a predetermined area of the right hand target 71. Following this step, the switch 122 on the left hand aiming device 18 is opened and the switch 122 on the right hand aiming device 18 is closed. The location of the projected beam on the left hand target 71 is noted. Horizontal adjusting screws 14 on the right hand housing 12 is adjusted until the projected beam of light is projected on a predetermined area of the left hand target 71. After the adjustments are completed, the aiming devices 18 are removed from the respective headlamps 11.

It will be understood that modifications and variations of the embodiment of the invention disclosed herein may be resorted to without departing from the spirit of the present invention and the scope of the appended claims.

Having thus described my invention, what I claim as new and desire to protect by Letters Patent is:

1. A headlamp testing device adapted for mounting on a vehicle headlamp having aiming pads on the lens thereof, said pads having front surfaces so disposed that a plane passing parallel thereto is normal to the central axis of said lens, said device comprising a symmetrical support member having a longitudinal axis, a radial flange on said member having a surface normal to the longitudinal axis of said support member, said normal flange surface being adapted to abut against said front surfaces for positioning said member relative to said lens so that the respective longitudinal and central axes are parallel, and means connected between said lens and said support member for holding said flange surface in abutting contact with the front surfaces of said pads.

2. A device adapted for use in the adjustment of a vehicle headlamp having aiming pads on the lens thereof, said pads having front surfaces so disposed that a plane passing parallel thereto is normal to the central axis of said lens, said device comprising a support member having a longitudinal axis, a flange on said member having a surface normal to the longitudinal axis of said support member, said normal flange surface being adapted to abut against said front surfaces and move in the plane of the pad front surface to effect a precision contact between the flange surface and the pad front surfaces, means connected between said lens and said support member for urging said normal flange surface into even contact with said pads so that the longitudinal axis of said member and the central axis of said lens are parallel, and means on said support member for indicating adjusted positions of said headlamp.

3. In a device adapted for use in the adjustment of a vehicle headlamp, a housing, a level carried by said housing, means pivotally mounting one end of said level on said housing, means including a yieldable support plate adjustably mounting the other end of said level on said housing, an indexing wheel adjustably positioned on said housing, a plurality of presettable stop members carried by said wheel for selective engagement with the support plate of said adjustable mounting means for positioning said level at one of a plurality of predetermined angular settings with respect to the longitudinal axis of said housing, and means for mounting said housing on said headlamp so that the longitudinal axis of the housing is parallel to the longitudinal axis of said headlamp whereby when said level is moved to horizontal position said headlamp is disposed in the desired vertically adjusted position.

4. In a device adapted for use in the adjustment of a vehicle sealed beam headlamp, a housing, a level supported by said housing, means pivotally mounting one end of said level on said housing, means including a yieldable support plate adjustably mounting the other end of said level on said housing, a post secured to said housing, an indexing wheel adjustably positioned on said post and engaging the support plate of said adjustable mounting means for positioning said level at predetermined angular settings with respect to the longitudinal axis of said housing, and means for mounting said housing on said sealed beam headlamp so that the longitudinal axis of the housing is aligned with the lonitudinal axis of said sealed beam headlamp whereby when said level is moved to compensate for an angular setting said headlamp is disposed in the desired vertically adjusted position.

5. In a device adapted for use in the adjustment of a vehicle headlamp, a housing having a raised section, a level supported by said raised section, means pivotally mounting one end of said level on said raised section, means adjustably mounting the other end of said level on said raised section, a post secured to said raised section, an indexing wheel slidably engaging said post for variable positioning thereon, a plurality of preset stop members carried by said wheel and arranged thereon so that only one stop member engages said raised section at any one setting of said wheel, a peripheral edge on said wheel engaging said adjustable mounting means for variably disposing said level in a predetermined angular position with respect to said raised section in response to the setting of said wheel, and means for mounting said housing on said headlamp so that the longitudinal axis thereof is parallel to the longitudinal axis of said headlamp whereby when said level is moved to horizontal position said headlamp is disposed in the desired vertically adjusted position.

6. In a device adapted for use in the adjustment of a vehicle headlamp, a housing, a level supported by said housing, means pivotally mounting one end of said level on said housing, means adjustably mounting the other end of said level on said housing, a post secured to said housing, an indexing wheel slidably engaging said post for variable positioning thereon, a plurality of preset stop members carried by said wheel and arranged thereon so that only one stop member engages said housing at any one setting of said wheel, a peripheral edge on said wheel engaging said adjustable mounting means for variably disposing said level in a predetermined angular position with respect to said housing in response to the setting of said wheel, and means for mounting said housing on said headlamp so that the longitudinal axis thereof is aligned with the longitudinal axis of said headlamp whereby when said level is moved to horizontal position said headlamp is disposed in the desired vertically adjusted position.

7. In a headlamp testing device, a housing having two depending walls, vertically disposed mounting plates, each of said vertical mounting plates being individually and directly attached to a respective one of said walls, a retaining clip removably attached to each of said mounting plates, and a light beam projector positioned between said clips and said mounting plates for removable attachment to said device.

8. In a headlamp testing device, a housing having two depending walls, a first vertically disposed mounting plate supported by one of said walls, means for horizontally adjusting said first plate with respect to said one wall, a second vertically disposed mounting plate supported by the other of said walls, means for vertically adjusting said second plate with respect to said other wall, a first retaining clip removably attached to said first plate, a second retaining clip removably attached to said second plate, and a light beam projector positioned between said clips and said plates for removable attachment to said device.

9. In a headlamp testing device, a housing, a plurality of vertically disposed mounting plates supported by said housing, each of said mounting plates having an upturned lip portion, means on said housing for adjusting said plates with respect to said housing, a spring wire retaining clip removably attached to the upturned lip portion of each of said mounting plates, and a light beam projector positioned between said clips and said mounting plates for removable attachment to said device.

10. In a headlamp testing device, a housing, a plurality of vertically disposed mounting plates supported by said housing and having notches therein, each of said mounting plates having an upturned lip portion, means on said housing for adjusting said plates with respect to said housing, a spring wire retaining clip removably attached to the upturned lip portion of each of said mounting plates, and a light beam projector received by said notches and detachably supported by said retaining clips.

11. Apparatus adapted for use in the adjustment of a pair of vehicle headlamps comprising a housing mounted to the lens of each of the headlamps, each housing having the longitudinal axis thereof parallel with the longitudinal axis of an associated headlamp, vertically disposed mounting plates supported by each of said housings, each of said plates having upturned lip portions, spring wire retaining clips removably attached to the upturned lip portion of each of said mounting plates, a light beam projector on each of said housings positioned between associated mounting plates and clips for removable attachment to its associated housing, and a vertically disposed target on each of said housings and positioned so that the plane thereof is substantially normal to a plane passing through the optical center of its associated projector, each of said housings being so disposed that a beam of light emitted by the associated projector projects on the target of the housing at the other headlamp for determining the adjustment of its associated headlamp.

12. A device for determining the orientation of a vehicle sealed beam headlamp having aiming surfaces on the lens thereof, said surfaces each being disposed so that a plane passing parallel thereto is oriented at a predetermined angle relative to the axis of a beam of light emitted through said lens, said device comprising a support member having a longitudinal axis and a support surface aligned in a plane substantially normal to said longitudinal axis and adapted to abut said aiming surfaces on said lens to bring said longitudinal axis into fixed angular relationship with respect to the axis of an emitted beam of light, means for attaching said support member to the lens of the headlamps, and means connected to said support member for projecting a spot of light in a predetermined direction with respect to the longitudinal axis of said support member for enabling the determination of the orientation of the headlamp.

13. A device for determining the orientation of a vehicle sealed beam headlamp having aiming surfaces on the lens thereof, said surfaces being disposed so that a plane passing parallel thereto is oriented at a predetermined angle relative to the axis of a beam of light emitted through said lens, said device comprising a support member having a longitudinal axis and a supporting surface aligned in a plane substantially normal to said longitudinal axis and adapted to abut said aiming surfaces on said lens to bring said longitudinal axis into fixed angular relationship with respect to the axis of an emitted beam of light, means for attaching said support member to the lens of the headlamp, and means connected to said support member for projecting a spot of light along a plane substantially parallel with the plane of said supporting surface to enable the orientation of said headlamp to be determined.

14. A headlamp aiming instrument adapted to be mounted on a sealed beam headlamp unit having planar aiming surfaces cast integral therewith which are oriented at a predetermined angle relative to the axis of an emitted beam of light, said instrument comprising a housing having planar support surfaces adapted to contact said planar aiming surfaces and orient said housing in a fixed angular relationship with respect to the axis of an emitted beam of light, means on said housing for engaging the lens surface of said headlamp and holding said planar support surface in close contact with said planar aiming surfaces, means connected to said housing for indicating the orientation of said emitted beam of light in a vertical plane, and a light projector connected to said housing for projecting a spot of light onto a target to indicate the orientation of said emitted beam of light in a horizontal plane.

15. In a testing device for determining the orientation of a vehicle headlamp the combination of: a support member, a level, means for pivotally mounting one end of said level to said support member, a projecting member connected to the other end of said level, a post carried by said support member, an indexing wheel rotatably mounted on said post having a surface thereon contacting said projecting member, and a plurality of preset stop members carried by said indexing wheel and arranged thereon to contact said support member one at a time in response to indexing wheel rotation for determining the angular setting of the level relatively to the support member.

References Cited in the file of this patent
UNITED STATES PATENTS

| | | |
|---|---|---|
| 976,416 | Webber | Nov. 22, 1910 |
| 2,101,077 | Langsner | Dec. 7, 1937 |
| 2,126,335 | Langsner | Aug. 9, 1938 |
| 2,132,063 | Whaley | Oct. 4, 1938 |
| 2,176,214 | Falge et al. | Oct. 17, 1939 |
| 2,337,502 | Scott et al. | Dec. 21, 1943 |
| 2,450,484 | Dodge | Oct. 5, 1948 |
| 2,514,878 | Kuperus | July 11, 1950 |
| 2,609,611 | Dickson | Sept. 9, 1952 |
| 2,663,083 | Harms | Dec. 22, 1953 |
| 2,687,864 | Kohler | Aug. 31, 1954 |
| 2,762,592 | Adams | Sept. 11, 1956 |
| 2,797,494 | Irwin | July 2, 1957 |
| 2,831,262 | Falge et al. | Apr. 22, 1958 |